United States Patent [19]

Hartnett et al.

[11] Patent Number: 4,761,390
[45] Date of Patent: Aug. 2, 1988

[54] OPTICALLY TRANSPARENT YTTRIUM OXIDE

[75] Inventors: Tom Hartnett, Nashua, N.H.; Michael Greenberg, Natick; Richard L. Gentilman, Acton, both of Mass.

[73] Assignee: Raytheon Company, Lexington, Mass.

[21] Appl. No.: 10,247

[22] Filed: Feb. 2, 1987

[51] Int. Cl.$^4$ ............................................. C04B 35/50
[52] U.S. Cl. ................................... 501/152; 501/126; 264/1.2; 264/56; 264/65
[58] Field of Search .................. 501/152, 126; 264/56, 264/65, 1.2

[56] References Cited

U.S. PATENT DOCUMENTS

| | | | |
|---|---|---|---|
| 3,545,987 | 12/1970 | Anderson | 501/152 X |
| 3,640,887 | 2/1972 | Anderson | 501/152 X |
| 3,711,585 | 1/1973 | Muta et al. | 501/152 X |
| 3,764,643 | 10/1973 | Muta et al. | 501/152 X |
| 3,873,657 | 3/1975 | Toda et al. | 501/94 X |
| 4,098,612 | 7/1978 | Rhodes et al. | 501/127 X |
| 4,174,973 | 11/1979 | Rhodes et al. | 501/152 X |
| 4,571,312 | 2/1986 | Greskovich et al. | 264/1.2 |

FOREIGN PATENT DOCUMENTS

| | | | |
|---|---|---|---|
| 2056763 | 5/1971 | Fed. Rep. of Germany | 501/152 |
| 356261 | 10/1972 | U.S.S.R. | 501/152 |
| 500206 | 1/1976 | U.S.S.R. | 501/152 |
| 197601 | 1/1976 | U.S.S.R. | 501/152 |
| 531795 | 10/1976 | U.S.S.R. | 501/152 |

OTHER PUBLICATIONS

W. D. Kingery, et al., "Grain, Growth, Sintering, and Vitrification," *Introduction to Ceramics*, John Wiley & Sons, NY (1960) pp. 448–469.
Andreeva, et al., "Structure and Optical Properties of Yttrium Oxide Films Prepared by Reaction Synthesis", Chemical Abstracts vol. 98 (1983), Abstr. No. 206711 q.
Rhodes et al., "Processing Studies for Optically Transparent $La_2O_3$-Doped $Y_2O_3$", GTE Laboratories Inc., Jul. 31, 1986, Office of Naval Research Contract N00014-82-C-0452.
Chemical Abstracts 98:206711.

Primary Examiner—William R. Dixon, Jr.
Assistant Examiner—Andrew B. Griffis
Attorney, Agent, or Firm—Denis G. Maloney; Richard M. Sharkansky

[57] ABSTRACT

A transparent yttrium oxide ceramic is made by densifying a yttrium oxide powder without addition of dopants. The yttrium oxide powder is consolidated into a body of a predetermined shape and sintered to a density such that any remaining porosity is sealed from the surrounding atmosphere. The closed porosity body is then subjected to an elevated pressure and temperature to provide the body with substantially 100% of theoretical density. The resulting body has substantial transparency over the wavelength range of 0.6 $\mu$m to 7 $\mu$m.

25 Claims, 3 Drawing Sheets

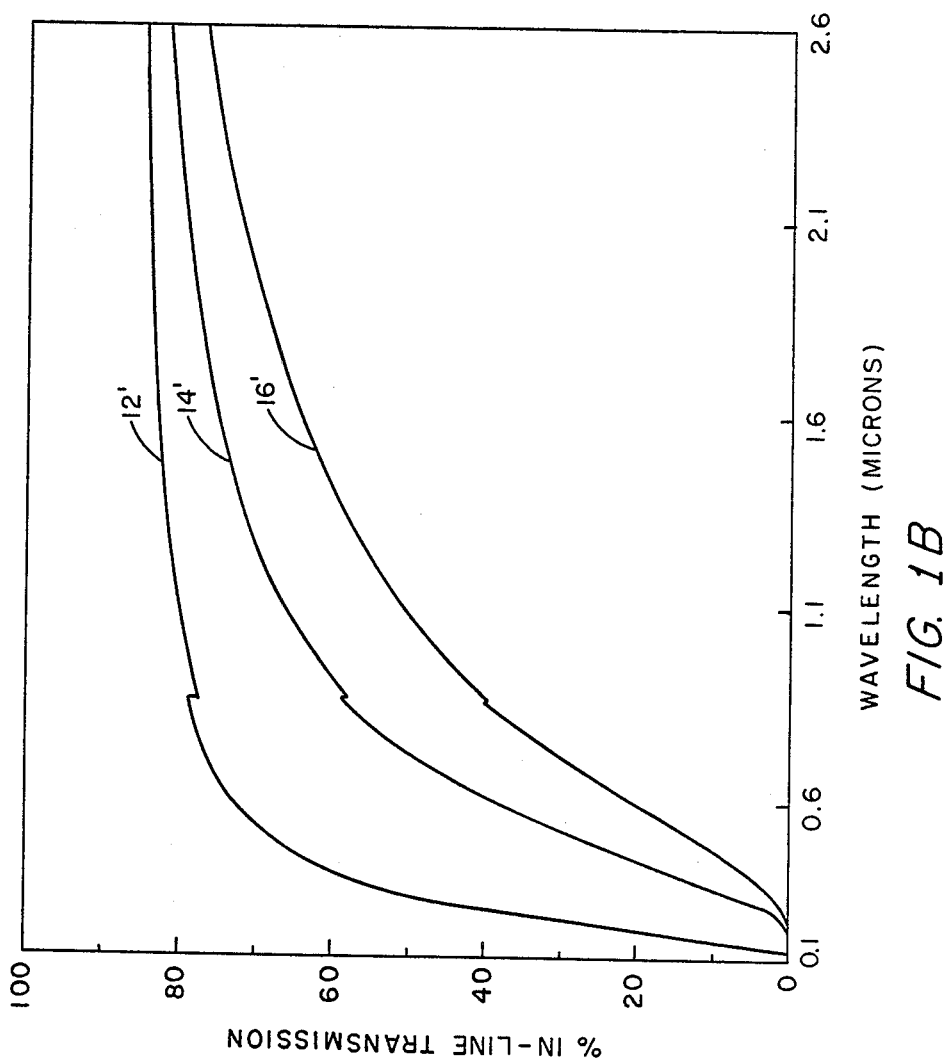

OPTICALLY TRANSPARENT YTTRIUM OXIDE

BACKGROUND OF THE INVENTION

This invention relates generally to optical materials and more particularly to a method of forming bodies of optically transparent yttrium oxide.

As known in the art, there is a need for materials which are highly durable, and which have substantial optical transparency in both the visible and infrared optical bands. Applications for these materials include commercial systems such as metal vapor lamps and optical windows, as well as, military systems, such as airborne optical imaging systems. Optical imaging systems such as those found on an infrared heat seeking missile, generally have one or more optical elements such as windows or domes which are mounted on the external portion of the missile. These external elements are provided to isolate the remaining optics of the imaging system from the external environment through which the missile is flown. These external elements, therefore, must have a particularly high degree of resistance to environmental exposures and must have sufficient strength to protect the remaining components in the imaging system during operation of the imaging system in addition to have the aforementioned substantial transparency in the visible and/or infrared spectrums.

Several materials have been identified as potential candidates for these applications. Each of these materials generally has a high degree of strength and is theoretically capable of having a relatively high degree of infrared transparency, particularly within the wavelength range of approximately 2 microns to 5 microns.

In addition to the aforementioned optical requirement for optical transparency in the wavelength range of approximately 2 microns to 5 microns, it is also desirable in certain applications that the optical element be transparent to wavelengths beyond 5 microns. For example, in missiles which are designed to travel at very high speeds for long periods of time, a dome mounted on the front portion of such a missile will reach elevated temperatures. A "hot" dome made of materials which do not transmit to long wavelengths beyond 5 microns, for example, may produce undesirable emissions resulting in increased system noise in the optical imaging system shielded by the dome.

Associated with such a "hot" dome is a requirement that the material of the dome withstand the thermal induced stresses created from the aerodynamic heating of the surface thereof. Some techniques for producing $Y_2O_3$ domes involve sintering to substantially full density a $Y_2O_3$ body. In these techniques, sintering aids such as La are added up to 10% by weight to achieve the high density. The addition of these sintering aids has one draw back. The sintering aids in a material such as $Y_2O_3$ will reduce its thermal conductivity. Thus, reduced thermal conductivity will provide a concomitant reduction in thermal shock resistance of a dome. A hot dome, therefore, is suceptible to damage due to the reduction in thermal shock resistance.

SUMMARY OF THE INVENTION

In accordance with the present invention, a method of forming a transparent yttrium oxide body comprises the steps of: providing a powder comprising of yttrium oxide and consolidating said powder into a body of a predetermined size and shape. The consolidated body is densified at an elevated temperature. Preferably, this temperature is in the range of 1700°–1900° C. more preferable in the range of 1800° C. to 1900° C. for period of time sufficient to densify the body to at least a closed porosity state. Typically, a closed porosity state for such a body is at least 91% and preferably 94% to 96% of the theoretical density of the yttrium oxide. The sintered, closed porosity body is then further densified to substantially 100% of theoretical density by subjecting said body to an elevated pressure preferably in the range of 25,000–30,000 psi for a period of time of typically ½–10 hours at elevated temperature preferable in the range of 1700–1900° C. The substantially fully densified body is then annealed in an atmosphere of air to restore the oxygen lost from the body during exposure to the elevated pressure and temperature environment. With this particular arrangement, a body comprised substantially 100% of yttrium oxide having an optical transparency of greater than 70% over the wavelength range of about 2–6 microns and having substantial optical transparency of at least 60% to wavelength to at least 7 microns is provided. Since the yttrium oxide body is substantially 100% yttrium oxide (at least 99.9% yttrium oxide), the body will have a high thermal conductivity and, hence, a high thermal shock resistance. Since this yttrium oxide body has substantial optical transparency beyond about 5 microns, the increased system noise, generally attributed to aerodynamic heating of the body when used as a dome on a very fast missile, for example, is substantially reduced.

In accordance with a further aspect of the present invention, a method of forming a transparent yttrium oxide dome comprises the steps of providing a powder of yttrium oxide having an average particle size of between 1 and 2.0 μm and having a maximum agglomerated particle size of 10 μm, with the yttrium oxide powder being substantially 99.99% yttrium oxide. The yttrium oxide powder is then consolidated into a dome of predetermined size and shape by cold isostatic pressing the powder in a pressing mold including a teflon-coated aluminum mandrel and a latex rubber or urethane rubber membrane to define the shape of the dome. The powder is inserted into the mold and the assembly is placed in an isostatic press and compacted at a pressure in the range of 25,000–30,000 psi. The compacted dome is then fired for a predetermined period of time at a temperature in the range of 1350°–1450° C. until the dome is approximately 75% of theoretical maximum density. This step is used primarily to drive off the binder vehicle and dispersant. However, some densification of the compacted dome does occur during exposure to the elevated temperature environment. The consolidated, dense dome is then densified to approximately 95% of theoretical density or to provide the dome having a closed porosity state by sintering the body in a vacuum furnace at a temperature in the range of 1700°–1900° C. The sintered densified dome is subjected to an elevated argon gas pressure of 25,000–30,000 psi and elevated temperature in the range of 1700°–1900° C. for a sufficient period of time to provide the dome having a density which is substantially equal to 100% of the theoretical density for yttrium oxide. During this final densification step, oxygen is lost from the body. The fully dense dome may be annealed to a clear, transparent state and hence to a stoichiometric composition by placing the dome in an atmosphere of air to restore the oxygen to the body. Typically, this anneal step occurs at a temperature in the range of 1400°–1800° C. with 1450° C. being a preferred temperature and with a dwell time at the maximum temperature of between 30 to 60 minutes or more depending on the size and thickness of the sample. With this particular arrangement, transparent yttrium oxide is provided having a high thermal shock resistance, high optical transparency, typically in excessive of 70% between 3.0 and 5.0 microns for a 2.8 millimeter thick sample, at least 60% transparency at wavelengths between 5 and 7 microns, and a relatively low coefficient of absorption of less than about 0.1 cm$^{-1}$ over the optical wavelength band of 3 to 5 microns is provided.

BRIEF DESCRIPTION OF THE DRAWINGS

The foregoing features of this invention, as well as the invention itself, may be more fully understood from the following detailed description of the drawings in which:

FIGS. 1A–1B graphs showing percent in-line optical transmittance as a function of wavelength for a sample of yttrium oxide fabricated in accordance with the present invention, over the visible spectrum (FIG. 1B) and infrared spectrum (FIG. 1A)

DESCRIPTION OF THE PREFERRED ENVIRONMENTS

Figure 1A:
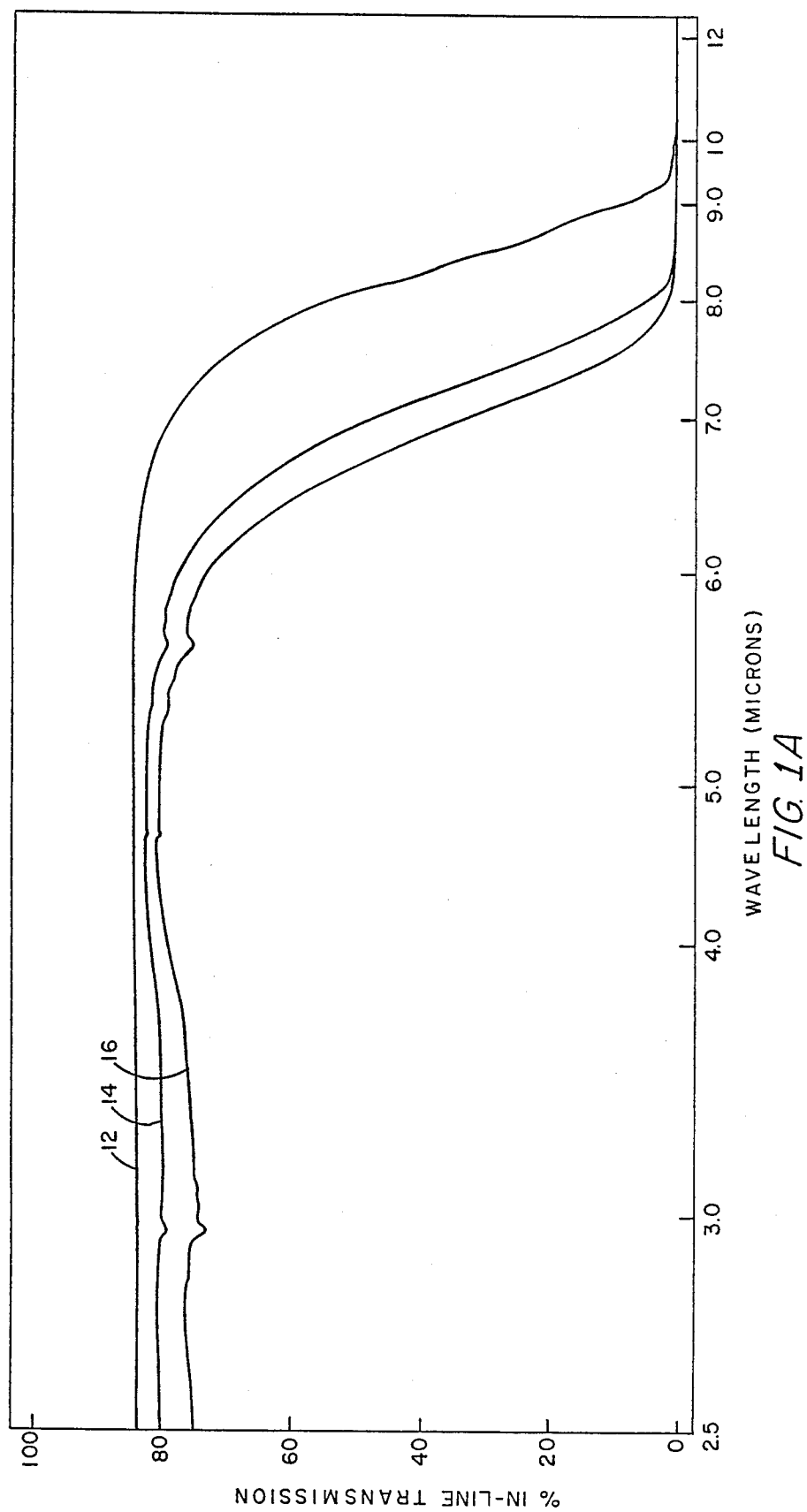

Fabrication of an optically transparent body comprising yttrium oxide will now be described. A powder comprising substantially 99.9% pure yttrium oxide preferable 99.99% $Y_2O_3$ having an average particle size of 1.0 μm–2.0 μm and having a maximum agglomerated particle size of 10.0 μm is provided. Yttrium oxide powder having the above-mentioned specifications is provided as follows:

Yttrium oxide powder is obtained from Union Moly Corp. White Plains, N.Y. having a surface area in the range of 20 to 45 m$^2$/g and an average particle agglomerate size of 1 to 3 micrometers. This powder is typically 99.99% pure yttrium oxide. The powder is de-agglomerated, by ball milling in a polyethylene jug or a rubber lined milling jar, for example, for a period of 5 to 24 hours using ceramic grinding media such as zirconium oxide or yttrium oxide. After milling, the slurry is passed through a 400 mesh sieve to remove any large agglomerates and provide a de-agglomerated powder having an average particle size between 1 and 2.0 micrometers and a maximum agglomerated particle size of 10 micrometers. The powder may be further de-agglomerated by passing the slurry through an ultrasonic horn to spray dry the powder. An organic binder vehicle such as poly-vinylpyrolidone (typically PVP40/PVP10 in ratio of 4:1) up to 3% by weight is added to the de-agglomerated powder before spray drying. A small amount of a dispersant such as acetic acid is also added to the powder. The de-agglomerated powder having the organic binder and dispersant is then passed through a spray drier which dries the slurry at a rate of 1 liter/hr. The spray drying process step is generally used for fabricating a nonplanar shaped body such as a hemispherical dome. It is generally easier to have a free flowing powder to fill a nonplanar mold such as that used for the hemispherical dome to insure a uniform density of the powder in the mold.

Once the powder having the above specified particle size is provided, the powder is inserted into a pressing mold which will provide a rough body having substantially the desired shape. For example, the pressing mold for a hemispherical dome may include a teflon-coated aluminum mandrel to form the dome concave surface and a latex rubber or urethane rubber membrane to define the convex surface of the dome. The mold is filled with powder through a hole provided in the top portion of the mold. The hole is sealed after air is evacuated from the mold. The assembly is then placed in an isostatic press and compacted at an elevated pressure. Typically, an elevated pressure in the range of about 25,000–30,000 psi is used.

After the rough dome has been removed from the mold, it is placed within a furnace having an air atmosphere at a temperature in the range of 1350°–1450° C. to burnout the binder vehicle previously provided in the mold. The body is kept at the elevated temperature for a period of time of up to 90 minutes. Typically, the fired body has a density of approximately 75% of theoretical density and has shrunk in size about 10 to 12 percent.

Final densification of the resulting green dome body is then provided in a two step process. The first step, the green dome is densified to a density of approximately 95% of theoretical density or to provide a body having a substantially closed porosity state, that is having a density greater than about 91%. This is accomplished by placing the body in a high vacuum tungsten furnace, which is disposed at a temperature in the range of 1700°–1900° C. A tungsten furnace is used to reduce contamination of the $Y_2O_3$ body. In particular, a graphite type furnace may cause severe loss of oxygen from the $Y_2O_3$ body as well as incorporation of carbon into the body. This type of furnace is used to reduce the reduction of $Y_2O_3$ by chemical reaction with a reducing agent such as carbon present in graphite type furnaces which are conventionally used during the sintering process. The body is maintained at the elevated temperature typically for a time of 60 minutes or less. Preferably, the body is enclosed or shielded by a $Y_2O_3$ container. During this sintering step, there may be a slight tungsten film deposited over surface portions of the body particularly if the body was not protected. This film is generally physically removed prior to final densification.

The sintered body is then densified to substantially 100% of theoretical density by subjecting the body to an elevated temperature in the range of 1700°–1900° C. and an argon gas pressure of 25,000–30,000 psi for a period of time of 5 to 10 hours or until substantially 100% of theoretical density for the body is achieved. Relatively, short soaks at the maximum temperature as required, so long as the cycle time is about 5 to 10 hours, at a minimum. The body is shield by a $Y_2O_3$ enclosure when placed within the high temperature graphite furnace used for this final densification step. After this densification treatment, the dome is fully dense (99.9+% of theoretical density) and may have a nonstiochiometry surface which gives the body a dark appearance.

The aforementioned dark body resulting from the reduction of the material by the non-oxygen containing atmosphere during the final densification step may be annealed to clear transparency by placing the dome in a furnace having an atmosphere of air to restore oxygen to the body. The body is subjected to a temperature of 1450° C. up to about 1800° C. with a dwell time of between 30 to 60 minutes in accordance with the size and thickness of the sample. After this annealing step, the dome is provided to a substantially clear, transparent state and may be ground and polished using conventional techniques to provide a predetermined surface finish and tolerance. For example, the body may be ground using fixed abrasive diamond tooling, and a predetermined surface finish may be provided using alumina powder and high speed lapping media.

An alternative annealing cycle would be to place the body in an atmosphere of water vapor and hydrogen and expose the body to a heat treatment in the temperature range of 1400° C. up to about 1800° C. with a dwell time at the higher temperature of typically 30 mins. A drawback to this particular annealing cycle, however, is the possibility of incorporation of $H_2$ and concomitant therewith undesirable optical absorption bands.

Referring now to FIGS. 1A and 1B, graphs of in-line transmittance uncorrected for surface reflection losses verses wavelength for samples having three different thickness are shown. Set forth in the Table are the process parameters for the three samples shown in FIGS. 1A and 1B, as well as, for other samples of the material fabricated in accordance with the present invention. Curve 12 is for a sample having a thickness of 0.040 inches, Curve 14 is for a sample having a thickness of 0.250 inches, and Curve 16 is for a sample having a thickness of 0.375 inches (FIG. 1A). The samples had an optical transparency of at least 73% over the wavelength range of 2.5 to 6 microns and at least 60% optical transparency beyond 6.5 microns (FIG. 1A). The percent in-line transmittance uncorrected for surface reflection losses is shown over the near uv, visible and infrared spectrums.

quired by previous methods which attempted to produce fully dense sintered bodies, the requirement for using a dopant additives to provide fully sintered bodies has been eliminated. The use of a W (tungsten) heating element furnace during the sintering cycle is seen as aiding the ability to sinter the material to the closed porosity state without any dopant additives. Furthermore, the W furnace aids in preventing contamination to the $Y_2O_3$ by the carbon reducing generally associated with graphite heating elements. Moreover, the yttrium oxide bodies fabricated in accordance with the present techniques are densified at significantly lower temperatures and shorter duration exposure to environments which are believed to increase degradation to the material and increase grain growth. Generally, material fabricated in accordance with the present invention has an average grain size of about 150 microns.

The calculated coefficient of absorption for material fabricated in accordance with the present invention is less than about 0.1 cm$^{-1}$. This value was derived using the formula below and data in FIG. 1A, Curves 12 and 16, at a wavelength of 4.0 microns.

$$\beta = \frac{\ln(T_2/T_1)}{t_2 - t_1}$$

where $T_2$, $T_1$ are % transmittance and $t_2$, $t_1$ are thickness (cm).

Having described preferred embodiments in the invention, it will now become apparent to one of the skill in the art that other embodiments incorporating their concepts may be used. It is felt, therefore, that these embodiments should not be limited to disclosed embodiments, but rather should be limited only to by the spirit and scope of the appended claims.

TABLE

| Curve | Thickness (inches) | % T @ 4.0 μm | Sinter[1,5] Temp. (°C.) | Time (mins.) | Final Densification[1,4] Temp. (°C.) | Time (hrs.) | Anneal Temp. (°C.) | Time (hrs.) |
| --- | --- | --- | --- | --- | --- | --- | --- | --- |
| 12 | 0.04 | 84 | 1890 | 30 | 1890 | 3 | 1450 | 5 |
| 14 | 0.25 | 81.5 | 1890 | 30 | 1890 | 3 | 1450 | 10 |
| 16 | 0.375 | 79 | 1890 | 30 | 1890 | 1 (min.) | 1450 | 10 |
| — | 0.10 | 82 | 1725 | 30 | 1890 | 62 | 1775 | 30 min.[3] |
|   |   |   |   |   | 1870 | 8 |   |   |

[1]Times are for the dwell time at the max. temperature.
[2]Two cycles of Final Densification each cycle approximately 18 hours.
[3]Anneal was done in $H_2O$ and $H_2$.
[4]Pressure was 29,000 psi.
[5]Final Sinter density was about 95%.

Curve 12' (FIG. 1B) which corresponds to Curve 12 in FIG. 1A shows a percent transmittance of at least 80% between 1.1 and 2.6 microns and at least 70% from 0.6 to 1.1 microns. The thicker samples 14 and 16 (FIG. 1A) and 14' and 16' (FIG. 1B) also show significant transparency from 0.6 microns to 6.0 microns in the infrared.

Figure 2:
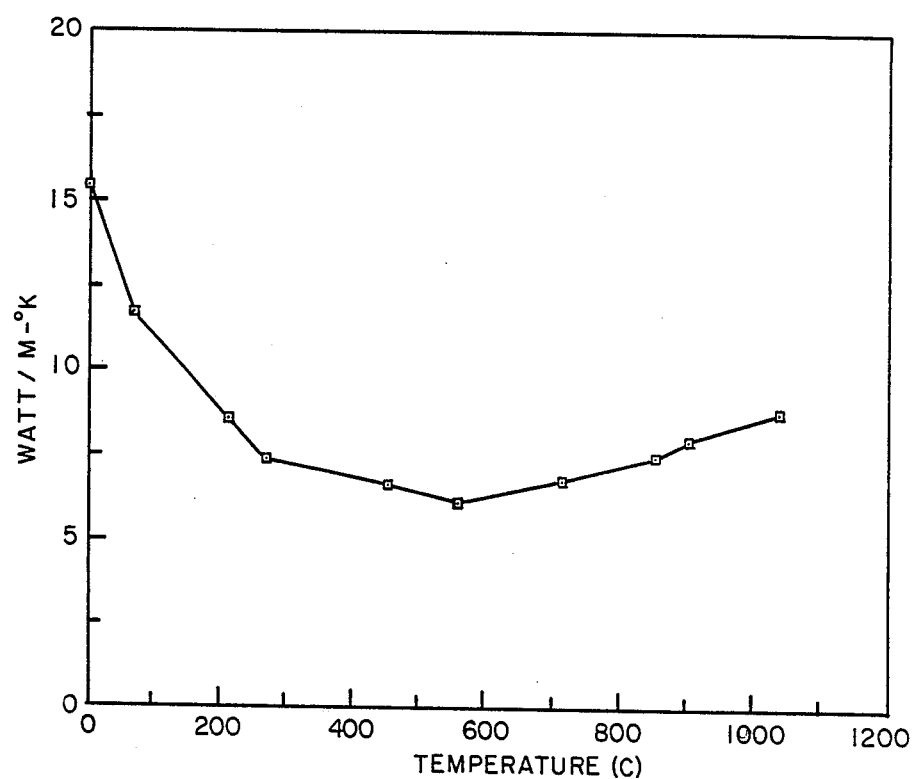
FIG. 2 is a graph of thermal conductivity vs. temperature typical of the $Y_2O_3$ fabricated in accordance with the present techniques.

Since the yttrium oxide bodies fabricated in accordance with the present invention are substantially pure, that is comprise substantially 99.9% yttrium oxide, the body comprised of yttrium oxide material has a high thermal conductivity and concomitant therewith, the yttrium oxide body will have a high thermal shock resistance, compared to yttrium oxide bodies having dopant additives. The thermal conductivity as a function of temperature, as measured for samples of $Y_2O_3$ fabricated in accordance with the present invention is shown in FIG. 2.

Since the body is sintered only to achieve a closed porosity state (between about 91% to 96% of theoretical density) and accordingly, relatively short periods of time and lower temperatures are used than those re-

What is claimed is:

1. A body comprising at least 99.9% yttrium oxide having a density of at least 99% of theoretically density, a sample of said body having an in-line transmission of at least 73%, over a wavelength range of 2-5 microns with said sample having a thickness of 0.375 inches.

2. The body as recited in claim 1 wherein the average grain size of the body is less than about 150 microns.

3. The body ar recited in claim 2 wherein the coefficient of absorption is less than about 0.1 cm$^{-1}$ at a wavelength of four microns.

4. A body comprising about 99.99% pure yttrium oxide having an average grain size of about 150 microns and a density of at least 99% of theoretical density, a sample of said body having an in-line transmission of at least 80%, over a wavelength range of 3-5 microns with said sample having a thickness of 0.040 inches.

5. The body as recited in claim 4 further having a coefficient of absorption less than about 0.1cm$^{-1}$ at a wavelength of 4.0 microns.

6. The body as recited in claim 5 having an in-line transmission of at least 76% over the wavelength range of 3-7 microns.

7. A body consisting essentially of at least 99.9% pure polycrystalline cubic yttrium oxide having an average grain size of about 150 microns, a thermal conductivity characteristic of at least 15 W/M-°K at 0° C. and at least 7W/M-°K over the temperature range of 0° C. to 300° C., and a density of at least 99.9% of theoretical density, a sample of said body having an in-line transmission of at least 80% over a wavelength range of at least 2.5 to 6.8 microns with said sample having a thickness of 0.04 inches.

8. The body of claim 7 wherein said yttrium oxide has a coefficient of absorption of less than about 0.1 cm$^{-1}$ at a wavelength of 4.0 microns.

9. A method of fabricating a body comprising at least 99.9% yttruim oxide, comprising the steps of:
providing a starting powder of at least 99.9% yttrium oxide;
compacting said yttrium oxide powder to form a body of at least 99.9% of yttrium oxide;
sintering said compacted 99.9% of yttrium oxide body at an elevated temperature to provide the body having a closed porosity state; and
densifying said closed porosity 99.9% of yttrium oxide body by heating said body to an elevated temperature at an elevated gas pressure for a predetermined period of time until said body achieves a density of substantially 100% of theoretical density.

10. The method of claim 9 wherein said starting powder has an average particle size of about 1.0 μm to 2.0 μm.

11. The method as recited in claim 10 wherein the sintering step occurs in a high vacuum tungsten heating element furnace.

12. The method as recited in claim 11 further comprising the step of:
annealing said body having substantially 100% of theoretical density by heating said body in an atmosphere comprised of air to restore the surface of the material to stoichiometric composition.

13. The method as recited in claim 9 wherein said sintering step occurs in a high vacuum tungsten heating element furnace.

14. The method as recited in claim 13 wherein said densifying step occurs at a temperature in the range of 1700° C. to 1900° C. at an elevated pressure in the range of 25,000 psi to 30,000 psi.

15. The method as recited in claim 14 wherein said temperature of the sintering step is in the range of 1700° C. to 1900° C.

16. The method as recited in claim 15 where in said temperature of the sintering step is in the range of 1800° C. to 1900° C.

17. The method of claim 12 wherein said annealing step occurs at a temperature of about 1450° C.

18. A method of fabricating a body comprising at least 99.99% yttrium oxide, comprises the steps of:
providing a yttrium oxide powder of 99.99% yttrium oxide, said powder having an average particle size between 1 and 2.0 micrometers, and having a maximum agglomerated particle size of 10 micrometers;
consolidating said powder to provide a body of substantially at least 99.99% yttrium oxide having a density of about 75% of theoretical density;
densifying the 75% dense body to a closed porosity state in a vacuum at a temperature in the range of 1700°-1900° C. for a period of time at the maximum temperature of about 30 minutes;
densifying the closed porosity body to substantially 100% of theoretical density by subjecting the body to a temperature in the range of 1700°-1900° C. at an argon gas pressure in the range of 25,000-30,000 psi; and
annealing said body in an air atmosphere at a temperature in the range of 1400° C.-1800° C. for a period of between 30 and 60 minutes at the elevated temperture.

19. The method as recited in claim 18 wherein the sintering step occurs in a high vacuum tungsten heating element furnace.

20. The method of claim 19 wherin said annealing step occurs at a temperature of about 1450° C.

21. A method of fabricating a non-planar body comprised of at least 99.9% yttruim oxide having an in-line transmittance of at least 80% over a wavelength range of 2.5 to 6.8 microns for a sample having a thickness of about 0.04 inches, comprises the steps of:
providing a yttruim oxide powder having an average particle size of 1 to 2.0 micrometers and having a maximum agglomerated particle size of 10 microns;
adding a binder vehicle and dispersent to the powder and spray drying the powder to provide a free flowing powder;
directing the free flowing powder into a non-planar mold and subjecting the powder in the non-planar mold to an isostatic pressure in the range of 25,000-30,000 psi;
removing the binder vehicle by subjecting the powder to a temperature in the range of 1350°-1450° C. for a predetermined period of time in an atmosphere of air;
densifying the powder to a closed porosity state in a vacuum at a temperature in the range of 1700°-1900° C. for a period of time at the maximum temperature of about 30 minutes or less;
densifying the closed porosity body to substantially 100% of theoretical density by subjecting the body to a temperature in the range of 1700°-1900° C. at an argon gas pressure in the range of 25,000-30,000 psi until the body is substantially 100% of theoretical density; and
annealing said body in an atmosphere comprising hydrogen and water vapor at a temperature in the range of 1700°-1800° C. for a period of between 30 and 60 minutes at the elevated temperature.

22. The method of claim 21 wherein said non-planar body is a hemispherical dome.

23. The method of claim 22 wherein the removing step occurs for a period of time until the body has achieved about 75% of theoretical density.

24. The body of claim 3 wherein said yttrium oxide has a thermal conductivity of at least 15 W/M-°K at 0° C., and at least 7 W/M-°K over the temperature range 0° to 300° C.

25. The body of claim 6 wherein said yttrium oxide has a thermal conductivity of at least 15 W/M-°K at 0° C., and at least 7 W/M-°K over the temperature range 0° to 300° C.

* * * * *